Dec. 23, 1930.                H. A. DENMIRE                1,786,291
                            TIRE VULCANIZING MOLD
                            Filed May 17, 1928            3 Sheets-Sheet 1
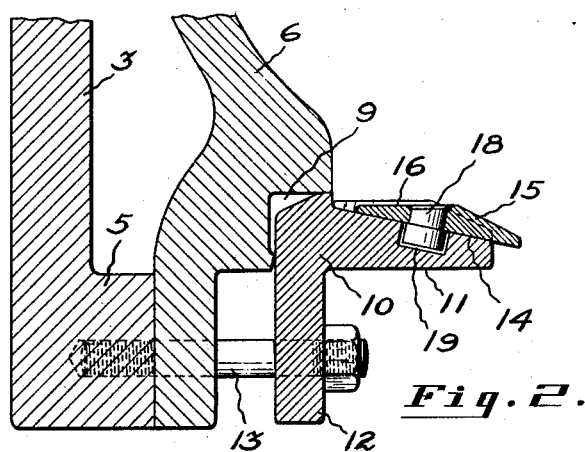
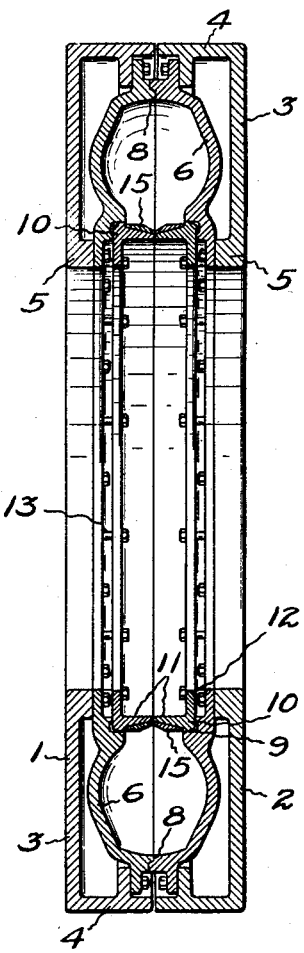
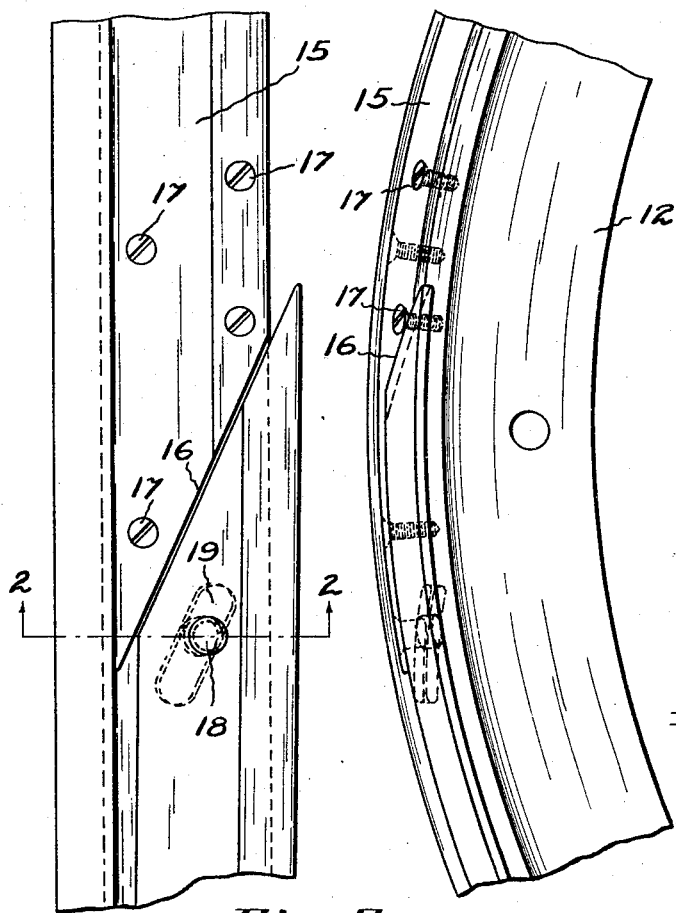
INVENTOR
Harold A. Denmire
BY
Evans & McCoy
ATTORNEYS Dec. 23, 1930.  H. A. DENMIRE  1,786,291
TIRE VULCANIZING MOLD
Filed May 17, 1928  3 Sheets-Sheet 2

INVENTOR
Harold A. Denmire
BY
Evans + McCoy
ATTORNEYS

Dec. 23, 1930.  H. A. DENMIRE  1,786,291
TIRE VULCANIZING MOLD
Filed May 17, 1928  3 Sheets-Sheet 3
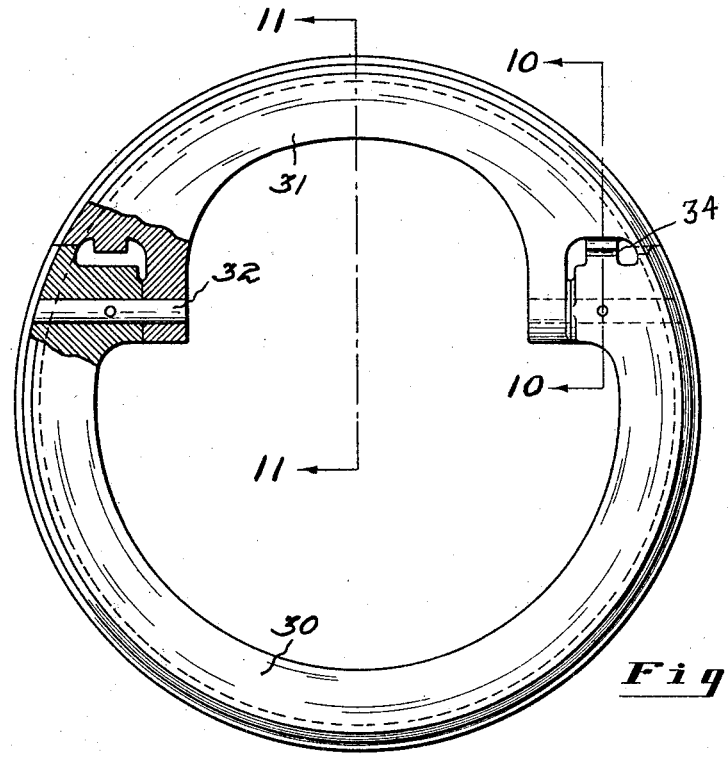
Fig. 9.
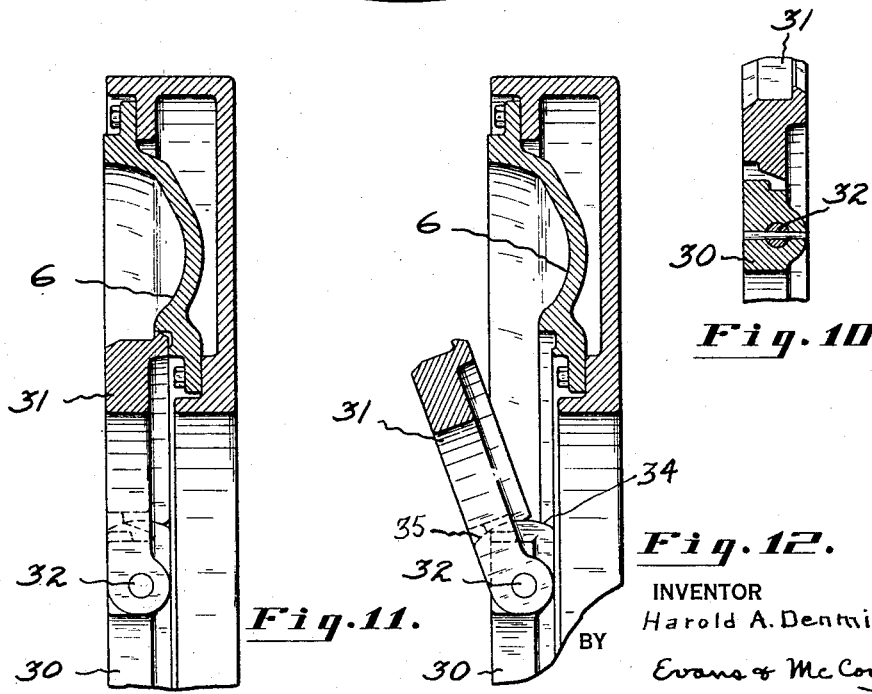
Fig. 10.
Fig. 11.
Fig. 12.
INVENTOR
Harold A. Denmire
BY Evans & McCoy
ATTORNEYS Patented Dec. 23, 1930

1,786,291

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

TIRE-VULCANIZING MOLD

Application filed May 17, 1928. Serial No. 278,446.

This invention relates to tire vulcanizing molds of the type composed of separable side sections provided with annular recesses conforming to opposite sides of the tire and forming between them a mold cavity in which the tire fits, the invention being particularly adapted to molds for vulcanizing tire casings.

The invention has for an object to provide a mold in which a portion of the mold engaging the interior surfaces or bases of the tire beads is collapsible or separately movable relative to the remainder of the mold when the mold is opened to permit easy removal of the tire casings.

A further object of the invention is to provide a mold in which the portions of the mold engaging the bases of the beads are automatically expanded into snug engagement with the tire beads when the mold is closed.

A further object of the invention is to provide a section of the mold in which each section carries a bead ring which is automatically expanded when the mold is closed and automatically contracted when the mold is opened.

A further object is to provide the sections of a mold with bead rings which are transversely divided and provided with abutting end portions having wedging engagement whereby the rings may be expanded or contracted by relative lateral movements of the end portions, and further, to provide bead rings formed of resilient metal which have a bias toward contracted position, the rings being engageable with each other when the mold is closed to force the projecting end portions laterally to expand the rings, the opening of the mold releasing the free ends of the rings and permitting the rings to automatically contract to free the tire casings.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 1 is an axial section through a mold embodying the invention.

Fig. 2 is a fragmentary transverse section through the inner portion of one of the mold sections, the section being taken on the line indicated at 2—2 in Fig. 3.

Fig. 3 is a fragmentary elevation of one of the bead rings viewed from the interior of the annular mold section, and showing the diagonal split in the ring.

Fig. 4 is a side elevation of the portion of the bead ring shown in Fig. 3.

Fig. 9 is a side elevation of a modified form of bead ring.

Fig. 10 is a section taken on line 10—10 of Fig. 9.

Fig. 11 is a section through the bead ring and the mold section to which it is applied, the section being taken on the line indicated at 11—11 in Fig. 9.

Fig. 12 is a section similar to Fig. 11 showing the pivoted section of the bead ring swung inwardly.

Figure 5:
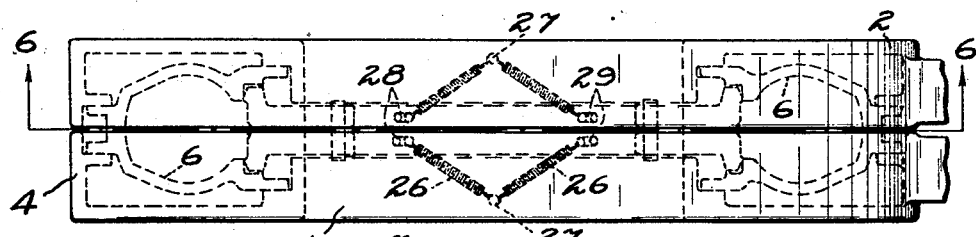
Fig. 5 is a side elevation of a mold embodying the invention in a modified form.
Figure 6:
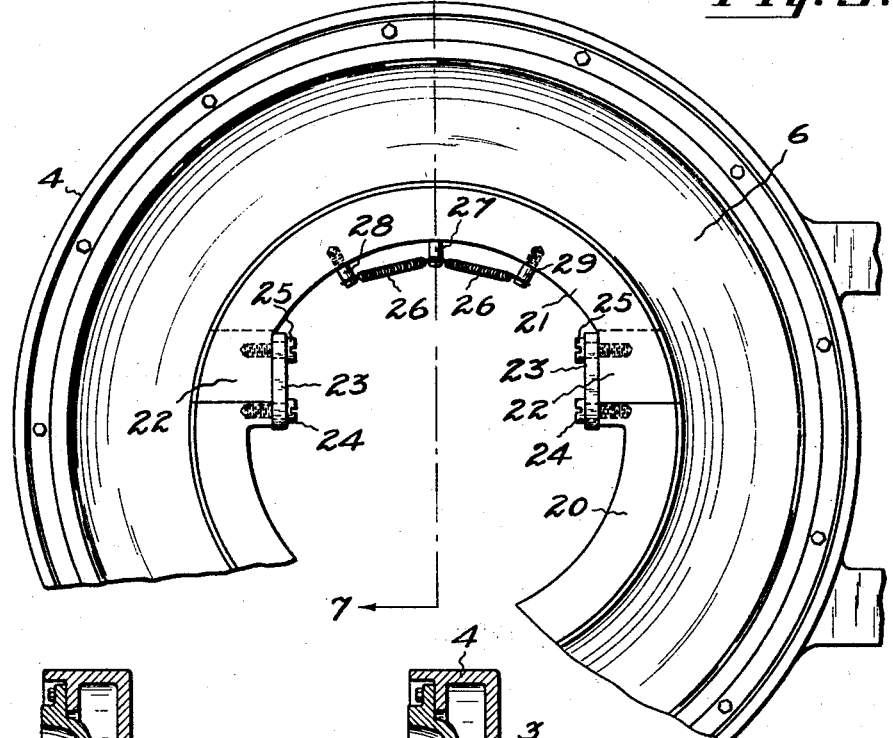
Fig. 6 is a fragmentary plan view of one of the mold sections shown in Fig. 5, looking toward the inner face thereof, as indicated by line 6—6 in Fig. 5.

Referring to the accompanying drawings, the invention is shown applied to a tire mold composed of two substantially identical side sections, 1 and 2, each having an outer shell of channel form which has a side wall 3, an outer circumferential flange 4 projecting inwardly from the side wall and an inner short flange 5 also projecting inwardly from the side wall.

Rigidly secured to the flanges 4 and 5 are recessed mold plates 6 which are rigidly secured to the flanges 4 and 5 of the shell and which are spaced from the side walls 3 to provide a steam chamber 7 in the mold section. The mold plates 6 have rabbeted outer edges 8 which abut throughout the circumference of the mold cavity formed between the plates in the central plane of the mold cavity. The inner portions of the plate are spaced apart and have rabbeted edges 9 which provide seats for base rings 10 which are angle shaped in cross section, each having at its outer edge a laterally projecting flange 11 and a flange 12 extending inwardly from the flange 11 in a plane parallel with the central plane of the mold. The base rings 10 are rigidly secured to the mold sections by bolts 13 extending through the flanges 12 of the base rings, the inner edge portions of the mold plate 6 and into the inner flange 5 of the outer shell of the mold section. The laterally projecting flanges 11 of the base ring extend inwardly to the center plane of the mold so that the base rings of the opposed mold sections abut edge to edge when the mold is closed. The outer surfaces 14 of the flanges 11 are conical and taper toward the center of the mold. These conical surfaces provide seats for bead rings 15 which are formed of resilient metal. The bead rings 15 are transversely divided at at least one point in their circumference by a diagonal split 16 which provides wedging engagement between the abutting ends of the ring at this point. The end of the ring which tapers outwardly is rigidly attached to the base ring 10 by means of screws 17 and the opposite end of the bead ring which overlies the tapering fixed end is free to move laterally and circumferentially with respect to the fixed end.

In the manufacture of the bead ring, the ring is heat treated in a contracted position in which one end of the ring is offset laterally with respect to the abutting end and overlaps the same to reduce the circumference. This gives the ring a bias toward contracted position so that the free end thereof, when free, moves laterally and circumferentially along the inclined face of the abutting end, reducing the diameter of the ring. The free end of the bead ring is preferably guided by a pin 18 which is fixed thereto and which slides in an inclined groove 19 in the conical face 14 of the base ring. When the mold is open, the free end of the bead ring 15 occupies the position shown in Fig. 3 and the external diameter of the bead ring is slightly less than the normal diameter thereof. This permits a tire casing to be easily fitted in one of the mold sections and when the complemental section is brought into engagement with the section in which the tire casing is placed, the bead rings of the two sections will engage edge to edge and as the mold sections are forced into close contact, the free ends of the bead rings will be forced outwardly into circumferential alinement with the fixed ends, causing the bead rings to expand to their normal diameter and snugly engage the beads of the tire casing. After the vulcanizing operation, the mold sections are separated and as the bead rings are moved apart, their free ends by their inherent resiliency spring outwardly and the rings contract to a diameter sufficiently less than the internal diameter of the tire beads to release the same and permit the tire casings to be easily removed from the mold.

In Figs. 5 to 8 of the drawing, there is shown a modification of the invention in which a modified form of collapsible bead ring is employed. The construction of the mold sections is substantially the same as that above described and the corresponding parts are designated by the same reference numerals. In this modification, the base ring 10 and collapsible bead ring 15 above described are replaced by a single bead ring 20 on each section, the bead ring 20 being of angle shape in cross section and fitting in the inner portions of the mold sections in substantially the same manner as the base rings 10 above described. The bead rings 20 are formed of resilient metal and each has a section 21 separated at each end from the remainder of the ring by diagonal cuts 22. The tapered ends of the sections 21 overlie the tapered ends with which they engage and the sections 21 are connected to the main section of the ring by means of short links 23 which are connected at their opposite ends to the main section of the ring and to the pivoted section 21 by means of pivots 24 and 25. The sectional ring 20 has a bias toward a contracted position in which the ring is of a diameter less than normal so that when the joints between sections are broken, the ring is automatically contracted. The pivoted section 21 is retained against excessive outward movement with respect to the inner face of the mold section by coil springs 26 which are connected to a pin 21 carried by the ring section 21 midway between its ends and with pins 28 and 29 attached to the mold section.

Figures 7, 8:
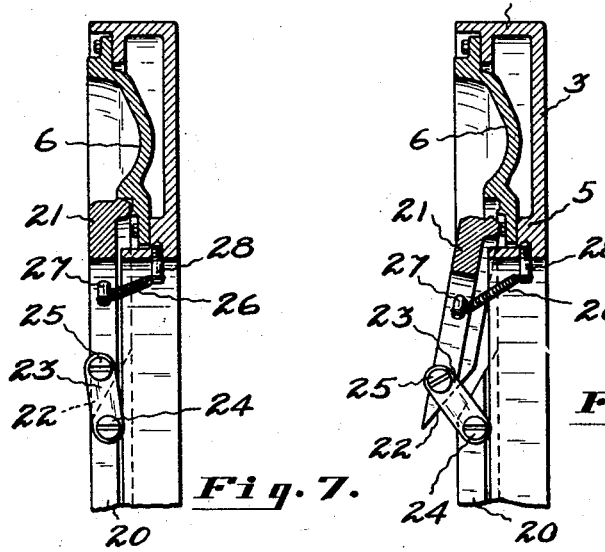
Fig. 7 is a transverse section through a mold section taken on the line indicated at 7—7 in Fig. 6.
Fig. 8 is a section similar to Fig. 7 showing the bead ring in collapsed position.

When the mold is closed, as shown in Fig. 5, the section 21 of each bead ring is forced to the position shown in Fig. 7 since the bead rings abut edge to edge. This movement of the pivoted section causes the bead rings to be expanded into snug engagement of the bases of the tire beads to hold the tire beads to proper diameter during the vulcanizing operation. After the mold is opened, the inward pressure on the pivoted section 21 such as would be caused in stripping the tire from the mold, will cause the pivoted section 21 to move inwardly to the position shown in Fig. 8, collapsing the bead ring and freeing the tire casing so that the tire casing can be easily removed from the mold.

In Figs. 9 to 12 of the drawing, there is shown a modification of the invention in which a bead ring 30 is employed on each of the mold sections 6. The bead ring 30 has a segment 31 connected by hinge pins 32 to the body of the ring and adapted to swing inwardly clear of the tire bead when the mold is opened to free the tire bead from the mold and permit easy removal thereof. The segment 31 has arms 33 at the ends thereof extending within the ends of the body portion of the ring, the hinge pins 32 passing through the arms 33 and the ends of the fixed body portion of the ring. The body portion of the bead ring at each end has a convex bearing surface 34 concentric with the axis of the hinge pin 32 and the segment 31 is provided at the ends thereof outwardly of the arms 33 with concave bearing surfaces 35 which bear upon the convex surfaces 34 so that a rigid bead ring is provided when the mold is closed.

It will be apparent that the present invention provides a mold in which the placing of the tire casings in the mold and the removal of the tire casings from the mold is greatly facilitated, since the tire receiving recesses are enlarged while the mold is open.

It will also be apparent that by reason of the fact that bead rings are expanded into engagement with the tire beads after the tire casings are placed in the mold, the danger of marring or otherwise damaging the bead portion of the tire while placing the uncured tire in the mold is eliminated.

Furthermore, by expanding the rings into engagement with the tire beads, a tighter engagement may be obtained between the bead rings and tire beads so that the tire casings are accurately formed to the correct internal diameter.

In addition, it should be noted that these advantageous results are obtained with a very simple mold structure and that the expanding and contracting of the bead ring is entirely automatic, no operations on the part of the operator being required in addition to the usual operations of inserting the green tire in the mold and stripping the cured tire from the mold.

Furthermore, it is to be understood that the particular form of apparatus shown and described, and the particular procedure set forth are presented for purposes of explanation and illustration and that various modifications of said apparatus and procedure can be made without departing from my invention as defined in the appended claims.

What I claim is:

1. A mold comprising separable side sections having annular recesses which conform to the tread and side walls of a tire casing, and a collapsible bead ring attached to each of the mold sections, said bead rings being engageable with the beads of a tire casing, said bead rings being expansible into snug engagement with a tire casing in the mold and contractible to a smaller diameter clear of the tire casing.

2. A mold comprising separable side sections having annular recesses which conform to the tread and side walls of a tire casing, and a collapsible annulus engageable with the beads of a tire casing, said annulus comprising a pair of transversely split collapsible bead rings, one carried by each mold section, said rings abutting edge to edge when the mold is closed.

3. A mold comprising a pair of complemental side sections, each having an annular recess which conforms to a side wall and to a part of the tread portion of a tire casing, said sections having collapsible rings attached thereto which abut edge to edge at the interior of the annular mold cavity, said rings having interengaging laterally movable parts and being expansible into snug engagement with the beads of a tire casing in the mold when the mold sections are brought together and contractible upon separation of the mold sections to free the tire casing.

4. A mold comprising a pair of complemental side sections, each having an annular recess which conforms to a side wall and to a part of the tread portion of a tire casing, said sections having collapsible rings which abut edge to edge at the interior of the annular mold cavity, said rings having diagonal splits providing end portions movable laterally toward each other, to contract the ring when the mold is opened, said end portions being moved outwardly to expand the rings upon engagement of the rings with each other in closing the mold.

5. A mold comprising separable side sections adapted to abut face to face and having annular recesses which conform to the side and tread portions of a tire casing, each mold section having a resilient contractile transversely divided ring along the inner margin of its annular recess, said rings abutting edge to edge when the mold is closed and having abutting diagonally disposed ends, each ring having an end portion movable outwardly from the face of the mold section upon which it is mounted to permit the ring to contract, the pressure on said end portions upon closing the mold forcing the same into alinement with the adjacent end of the ring and the wedging engagement between the diagonally disposed ends of each ring causing said ring to be expanded as the mold is closed.

6. A mold comprising separable side sections having complemental recesses forming an annular mold cavity conforming to the sides and tread portions of a tire casing, and transversely divided bead rings carried by said sections, said rings having interengaging movable parts for automatically expanding the same upon the closing of the mold.

7. A mold comprising separable side sections having complemental recesses forming an annular mold cavity conforming to the side and tread portions of a tire casing, and transversely divided bead rings carried by said sections, said rings being normally of an external diameter less than the internal diameter of the tire casing and having means operable upon closing the mold for expanding the rings into snug engagement with a tire casing in the mold.

8. A mold comprising separable side sections adapted to abut face to face and having annular recesses which conform to the side and tread portions of a tire casing, each mold section having a resilient contractile transversely divided ring along the inner margin of its annular recess, said rings abutting edge to edge when the mold is closed and having abutting diagonally disposed ends, each ring having an end portion movable outwardly from the face of the mold section upon which it is mounted to permit the ring to contract, the pressure on said end portions upon closing the mold forcing the same into alinement with the adjacent end of the ring and the wedging engagement between the diagonally disposed ends of each ring causing said ring to be expanded as the mold is closed, each ring being resilient and biased toward its contracted position whereby the ring automatically contracts upon opening the mold.

In testimony whereof I affix my signature.

HAROLD A. DENMIRE.